(No Model.)
G. A. FREI.
AMPÈRE METER.
No. 423,600. Patented Mar. 18, 1890.
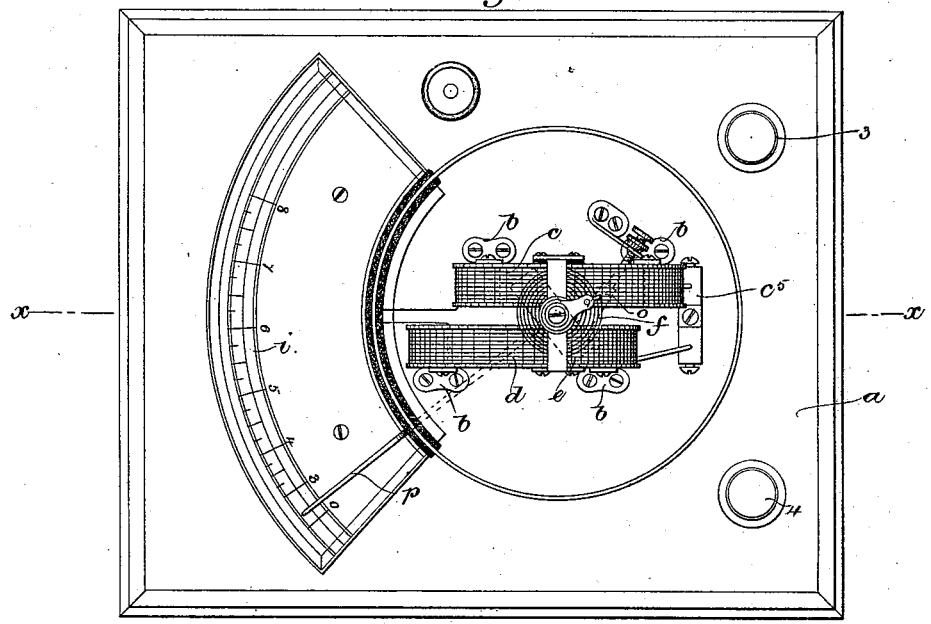
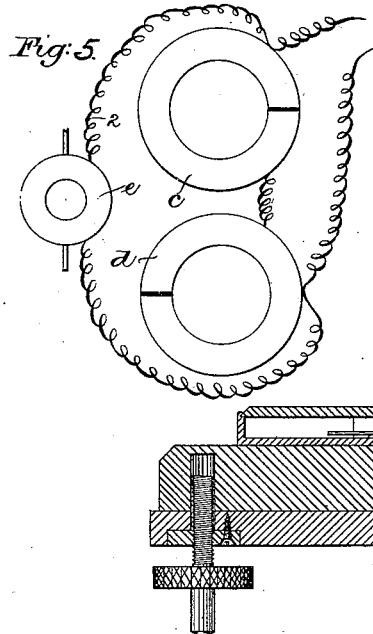
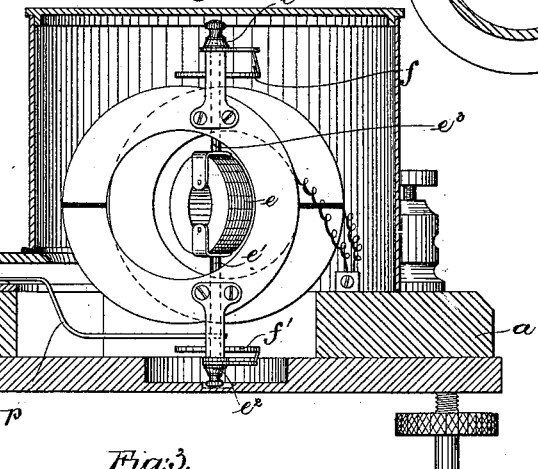
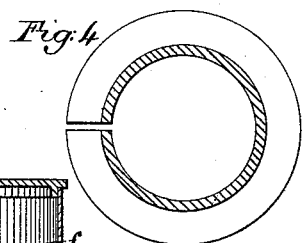
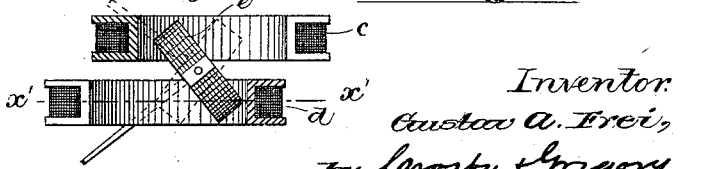
Witnesses:
Edgar A. Goddin
Manrick L. Emery
Inventor:
Gustav A. Frei,
by Crosby & Gregory
Attys

UNITED STATES PATENT OFFICE.

GUSTAV A. FREI, OF BOSTON, MASSACHUSETTS, ASSIGNOR TO THE BERNSTEIN ELECTRIC COMPANY, OF PORTLAND, MAINE.

AMPÈRE METER.

SPECIFICATION forming part of Letters Patent No. 423,600, dated March 18, 1890.

Application filed December 3, 1889. Serial No. 332,424. (No model.)

*To all whom it may concern:*

Be it known that I, GUSTAV A. FREI, of Boston, county of Suffolk, State of Massachusetts, have invented an Improvement in Ampère Meters, of which the following description, in connection with the accompanying drawings, is a specification, like letters on the drawings representing like parts.

This invention has for its object to construct an ampère meter which may be used to measure either alternating or direct currents.

In accordance with this invention, two stationary coils are placed side by side and offset or arranged in such a manner that the inner winding of one coil is substantially parallel with the outer winding of the other coil at one side and reversely at the opposite side. A coil of wire is placed within the two stationary coils, being held by spindles which occupy a vertical position between the said stationary coils. A spring or equivalent is employed to normally hold the inner coil at an angle of about thirty degrees with relation to the stationary coils. A pointer is fixed to or moved by the inner coil over a suitable graduated dial. The two stationary coils for the purpose to which I particularly desire to put the instrument—as, for instance, to measure the ampère strength of currents—are included in the main circuit in series, and the inner is arranged in shunt, although it is obvious that I may depart from this arrangement if it is deemed desirable.

Figure 1 shows in plan view a meter embodying this invention; Fig. 2, a longitudinal section of the meter shown in Fig. 1, taken on the dotted line $x\ x$; Figs. 3 and 4, details to be referred to, and Fig. 5 a diagram showing the preferable arrangement of circuits.

The base-plate $a$ has secured to it by suitable brackets $b$ two spools, upon each of which is wound a coil of wire, constituting two stationary coils $c\ d$. The two stationary coils $c\ d$ are placed side by side and offset with relation to each other, so that the outer winding of one coil will be substantially parallel with the inner winding of the other coil at one side, and reversely at the other side, as shown in Figs. 1 to 4.

An inner coil $e$ (see Fig. 3) is secured to a spindle, the lower end $e'$ of which is mounted in a step-bearing $e^2$, at the base of the instrument, and the upper end $e^3$ of which is mounted in a step-bearing $e^4$ at the top of the instrument, said spindle $e'\ e^3$ occupying a vertical position between the two stationary coils $c\ d$.

A main spring $f$ is provided, one end of which is attached to the spindle and the other end to the frame-work, the tension of said spring being set to normally hold the inner coil at an angle of thirty degrees with relation to the stationary coils, and in such a diametrical position the sides of said inner coil approach the inner windings of the said stationary coils.

The pointer $p$ is fastened to the lower end $e'$ of the spindle, and it moves over a graduated dial or index $i$, laid on and secured to the base-plate $a$. A counterbalancing-spring $f'$ is secured to the lower end of the spindle and to the frame-work, to counterbalance the effect of the spring $f$.

A limiting-stop $o$ (see Fig. 1) is arranged in suitable bearings, against which the inner coil strikes when it has moved into a position with the pointer at zero, and also when it has moved into a position with the pointer at the highest number on the dial.

As shown in Fig. 5, the two stationary coils $c\ d$ are included in the main circuit in series, and the inner coil $e$ included in a shunt-wire 2. In the instrument when arranged in this manner, the current will pass from the binding-post 3 to the plate or brackets $b$ of the coil $c$, thence through the coil $c$ to the plate $c^5$, thence through the coil $d$ to the plate or brackets $b$, and to the binding-post 4, while the shunt-current passes from the coil $c$ through the frame $e^2$, spring $f'$, spindle $e'$, and coil $d$. When the current is turned on and the meter connected, the tendency of the inner coil is to move toward the opposite sides of the stationary coils, against the tension of the springs $f\ f'$, and the angle of deflection will be proportional to the current flowing through the coils.

I claim—

1. In an electric meter, two stationary coils placed side by side and offset as described, combined with a movable inner coil, a pointer moved by it, and an index, substantially as described.

2. In an electric meter, two stationary coils placed side by side and offset as described combined with a movable inner coil, a spring to hold it, with its sides approaching the inner windings of the stationary coils, a pointer, and index, substantially as described.

3. In an electric meter, two stationary coils connected in series, placed side by side and offset as described, combined with a movable coil within them and connected in shunt with the said stationary coils, substantially as described.

In testimony whereof I have signed my name to this specification in the presence of two subscribing witnesses.

GUSTAV A. FREI.

Witnesses:
BERNICE J. NOYES,
E. J. BENNETT.